US005504872A

United States Patent [19]

Tanaka

[11] Patent Number: 5,504,872
[45] Date of Patent: Apr. 2, 1996

[54] ADDRESS TRANSLATION REGISTER CONTROL DEVICE IN A MULTIPROCESSOR SYSTEM

[75] Inventor: Kouji Tanaka, Tokyo, Japan

[73] Assignee: NEC Corporation, Tokyo, Japan

[21] Appl. No.: 445,554

[22] Filed: May 22, 1995

Related U.S. Application Data

[63] Continuation of Ser. No. 890,279, May 29, 1992, abandoned.

[30] Foreign Application Priority Data

May 31, 1991 [JP] Japan .................... 3-155360

[51] Int. Cl.⁶ .................... G06F 12/08; G06F 12/10
[52] U.S. Cl. .................... 395/413; 395/419; 364/230.3; 364/230; 364/246.3; 364/255.7; 364/256.3; 364/256.4; 364/961.2; 364/DIG. 1; 364/DIG. 2
[58] Field of Search .................... 395/413, 419, 395/400; 364/230.3, 230, 230.4, 246.3, 255.7, 256.3, 256.4, 933.2, 955

[56] References Cited

U.S. PATENT DOCUMENTS

| | | | |
|---|---|---|---|
| 3,723,976 | 3/1973 | Alvarez et al. ............... | 395/425 |
| 4,068,303 | 1/1978 | Morita ............... | 395/400 |
| 4,093,986 | 6/1978 | Bodner et al. ............... | 395/425 |
| 4,325,116 | 4/1982 | Kranz et al. ............... | 395/425 |
| 4,577,274 | 3/1986 | Ho et al. ............... | 395/425 |
| 4,669,043 | 5/1987 | Kaplinsky ............... | 395/400 |
| 4,816,991 | 3/1989 | Watanabe et al. ............... | 395/400 |
| 4,985,828 | 1/1991 | Shimizu et al. ............... | 395/400 |
| 5,226,132 | 6/1993 | Yamamoto et al. ............... | 395/400 |
| 5,237,668 | 8/1993 | Blanoy et al. ............... | 395/400 |
| 5,307,495 | 4/1994 | Seino et al. ............... | 395/650 |

*Primary Examiner*—Tod R. Swann
*Assistant Examiner*—Frank J. Asta
*Attorney, Agent, or Firm*—Foley & Lardner

[57] ABSTRACT

A multiprocessor system address translation register control device that creates a directory for the handling of various address translation registers, wherein the directory retains processor data indicative of which of a plurality of address translation registers that can be accessed by multiple processors are actually being used by those processors. This device also uses a partial number register for the handling of various address translation registers, wherein the partial space number register retains partial space numbers for the partial space that all of the address translation registers take as input. By setting and resetting processor indicating data numbers to this directory, and by setting partial space numbers to a partial space number register, this device controls the address translation register allotments for the handling of multiple processors.

8 Claims, 8 Drawing Sheets

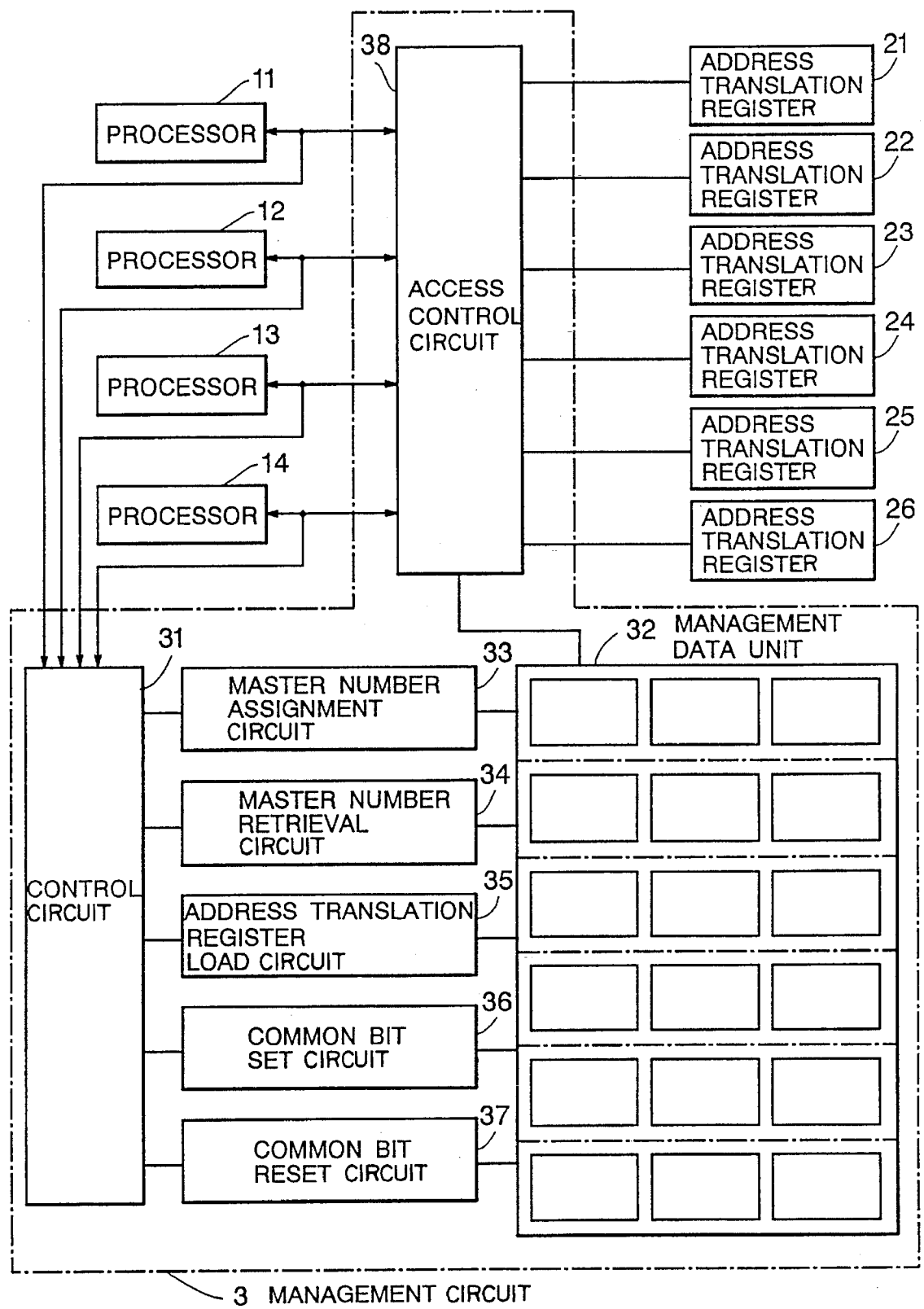

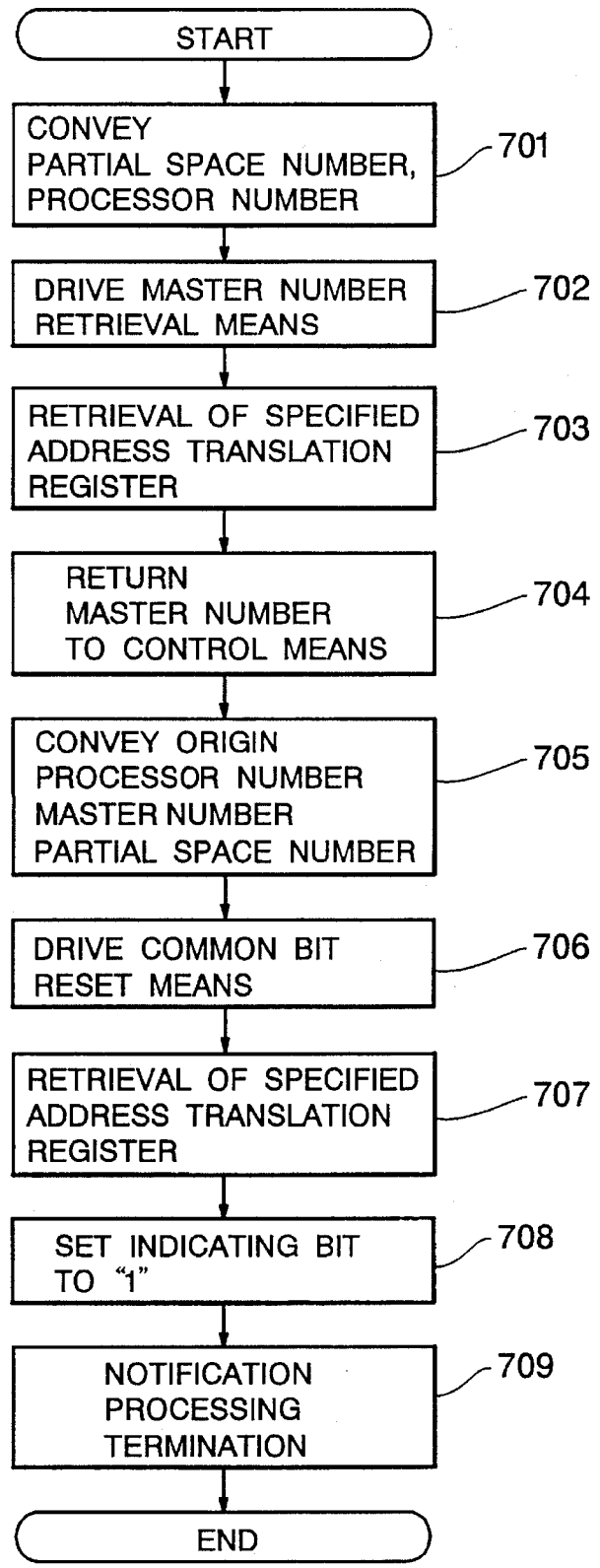

ADDRESS TRANSLATION REGISTER CONTROL DEVICE IN A MULTIPROCESSOR SYSTEM

This application is a continuation of application Ser. No. 07/890,279, filed May 29, 1992, now abandoned.

BACKGROUND OF THE INVENTION

1. Field of the Invention

This invention relates to an address translation register control device which makes possible extremely flexible shared control of the address translation register in a multiprocessor system.

2. Description of the Prior Art

Address translation registers are registers which load and retain mapping data of virtual and physical space (which are necessary in translating virtual addresses into physical addresses) from memory page tables, etc., and they are used for accelerating address translation, etc. Also, with address translation register control systems of conventional multiprocessor systems, a "master/slave" system in which the processors are logically divided up into master processors and slave processors is employed. In the master/slave system, the slave processor is forced to share the address translation register used by the master processor.

With the aforementioned conventional address translation register control system, the address translation register used in master processor operation tasks can be used in other tasks, which are slave processor operation tasks.

However, since master processors are not capable of independently sharing other address translation registers (ex: the case mentioned above), as long as the slave processor continues to use the address translation register used in master processor operation tasks, it was not possible to convert tasks executed by the master processor into different tasks and thereby make use of other address translation registers. Because of this type of restriction, the processing efficiency of the multiprocessor system (which makes use of a combination of address translation registers) could not be improved.

SUMMARY OF THE INVENTION

The purpose of the invention is to offer an address translation register control device which is capable of improving the processing efficiency of multiprocessor systems using a combination of address translation registers, by being capable of highly flexible shared control, exemplified by the capability of changing the original task of a processor which has been using an address translation register, even in the case of a different task being executed by a different processor which is making use of the same address translation register.

In a preferred embodiment of this invention to attain this object, the address translation register control device in a multiprocessor system consisting of multiple processors comprises multiple address translation registers used for address translation of multiples of partial space by dividing virtual space and having the capability to use the multiple processors in common, and a management circuit for effecting a discretionary allotment and release of the above optional address translation register upon the request from each processor above;

the management circuit for each address translation register having a processor data retention circuit, which retains the processor indicating data that use the address translation register, and a partial space data retention circuit, which retains the indicating data from the partial space that the address translation register takes for its object, so as to allot the address translation register to the processor, by setting and resetting to the processor indicating data retention circuit and by setting to the partial space data retention circuit for partial space indicating data.

According to a preferred embodiment of the invention, in the address translation register control device in the multiprocessor system, the processor data retention circuit of the management circuit holds many binary digit string for handling the multiple processors, and uses the various bit values of the binary digit string as the processor indicating data.

According to a preferred embodiment of the invention, in the address translation register control device in the multiprocessor system, the management circuit includes a reset circuit, which releases the indicating data which handle the processor for the processor data retention circuit corresponding to the above address translation register that the processor has finished using, and a set circuit, which sets the space indicating data that handle the processor for the processor data retention circuit, which handles the address translation register during its use, in cases when the address translation register being used by the above processor or other processors is being used in common.

According to a preferred embodiment of the invention, in the address translation register control device in the multiprocessor system, the management circuit includes a loading circuit, which sets the partial space indicating data for the partial space data retention circuit, loading the partial space address translation data which handle calls to the as yet unused address translation register when there has been a new call for allotment of the address translation register from the processors and setting the indicating data which handle the processors for the processor data retention circuit that handles the address translation register.

According to a preferred embodiment of the invention, in the address translation register control device in the multiprocessor system, the management circuit includes the access control circuit which controls access from the processor that handles indicating data for the processor data retention means to the address translation register that handles the processor data retention circuit.

According to another preferred embodiment of the invention, in the address translation register control device in the multiprocessor system, the management circuit includes, a reset circuit, which releases the indicating data which handle the processor for the processor data retention circuit corresponding to the above address translation register that the processor has finished using, a set circuit, which sets the indicating data that handle the processor for the processor data retention circuit, which handles the address translation register during its use, in cases when the address translation register being used by the above processor or other processors is being used in common, a loading circuit, which sets the partial space indicating data for the partial space data retention circuit, loading the partial space address translation data which handle calls to the as yet unused address translation register when there has been a new call for allotment of the address translation register from the processors and setting the indicating data which handle the processors for the processor data retention circuit that handles the address translation register, and access control circuit, which controls access from the processor that handles indicating data for the processor data retention circuit to the address translation register that handles the processor data retention circuit.

According to still another preferred embodiment of the invention, in the address translation register control device in the multiprocessor system, the management circuit includes, for each address translation register, a master number retention circuit, which processes the master numbers that carry the content for discrimination of the tasks allotted to the processors, a circuit to set the master number in the master number retention circuit, which handles calls to the as yet unused address translation register, when there has been a new call for allotment of the address translation register from the processors, and a circuit to return the master number of the master number circuit, which handles the address translation register while it is in use, when the address translation register being used by the above processor or other processors is being used in common.

According to still another preferred embodiment of the invention, in the address translation register control device in the multiprocessor system, the management circuit includes, a reset circuit, which releases the indicating data which handle the processor for the processor data retention circuit corresponding to the above address translation register that the processor has finished using, a set circuit, which sets the indicating data that handle the processor for the processor data retention circuit, which handles the address translation register during its use, in cases when the address translation register being used by the above processor or other processors is being used in common, a loading circuit, which sets the partial space indicating data for the partial space data retention means, loading the partial space address translation data which handle calls to the as yet unused address translation register when there has been a new call for allotment of the address translation register from the processors and setting the indicating data which handle the processors for the processor data retention circuit that handles the address translation register, for each address translation register, a master number retention circuit, which processes the master numbers that carry the content for discrimination of the tasks allotted to the processors, a circuit to set the master number in the master number retention circuit, which handles calls to the as yet unused address translation register, when there has been a new call for allotment of the address translation register from the processors, and a circuit to return the master number of the master number circuit, which handles the address translation register while it is in use, when the address translation register being used by the above processor or other processors is being used in common.

The other purposes, characteristics, and efficiency of the invention should be clarified by the following detailed descriptions.

BRIEF DESCRIPTION OF THE DRAWINGS

FIG. 1A is a block diagram indicating the multiprocessor system according to the preferred embodiment of the invention which employs the address translation control device of the invention.

FIG. 7 is a flow chart which serves to describe processing of an address translation register share request from the processor.

DESCRIPTION OF THE PREFERRED EMBODIMENT

Figure 1B:
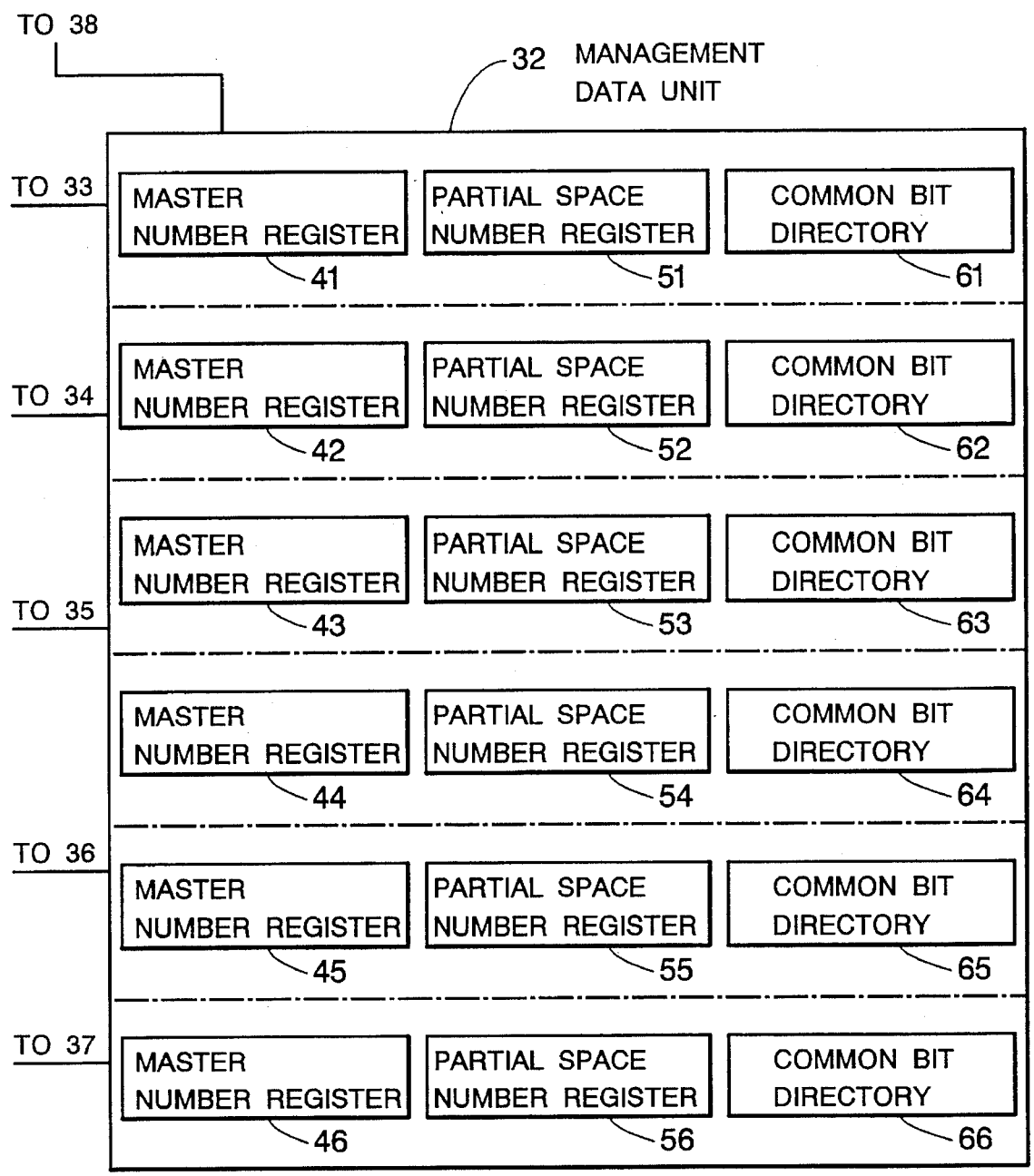
FIG. 1B is a block diagram which indicates management data unit of the address translation control device.
Figure 2:
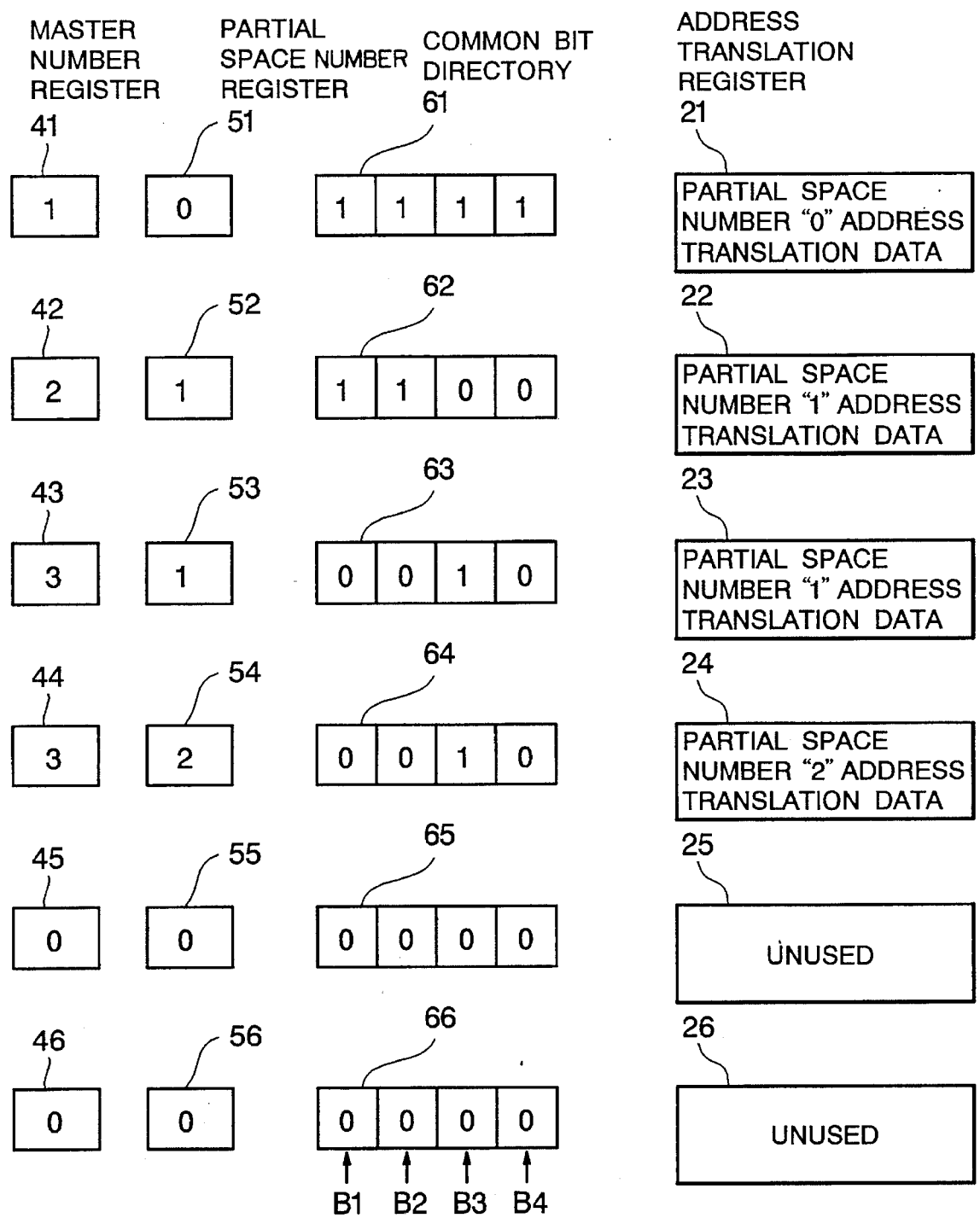
FIG. 2 is a diagram which indicates one state of the management data unit corresponding to the address translation register of the address translation register control device.
Figure 3:
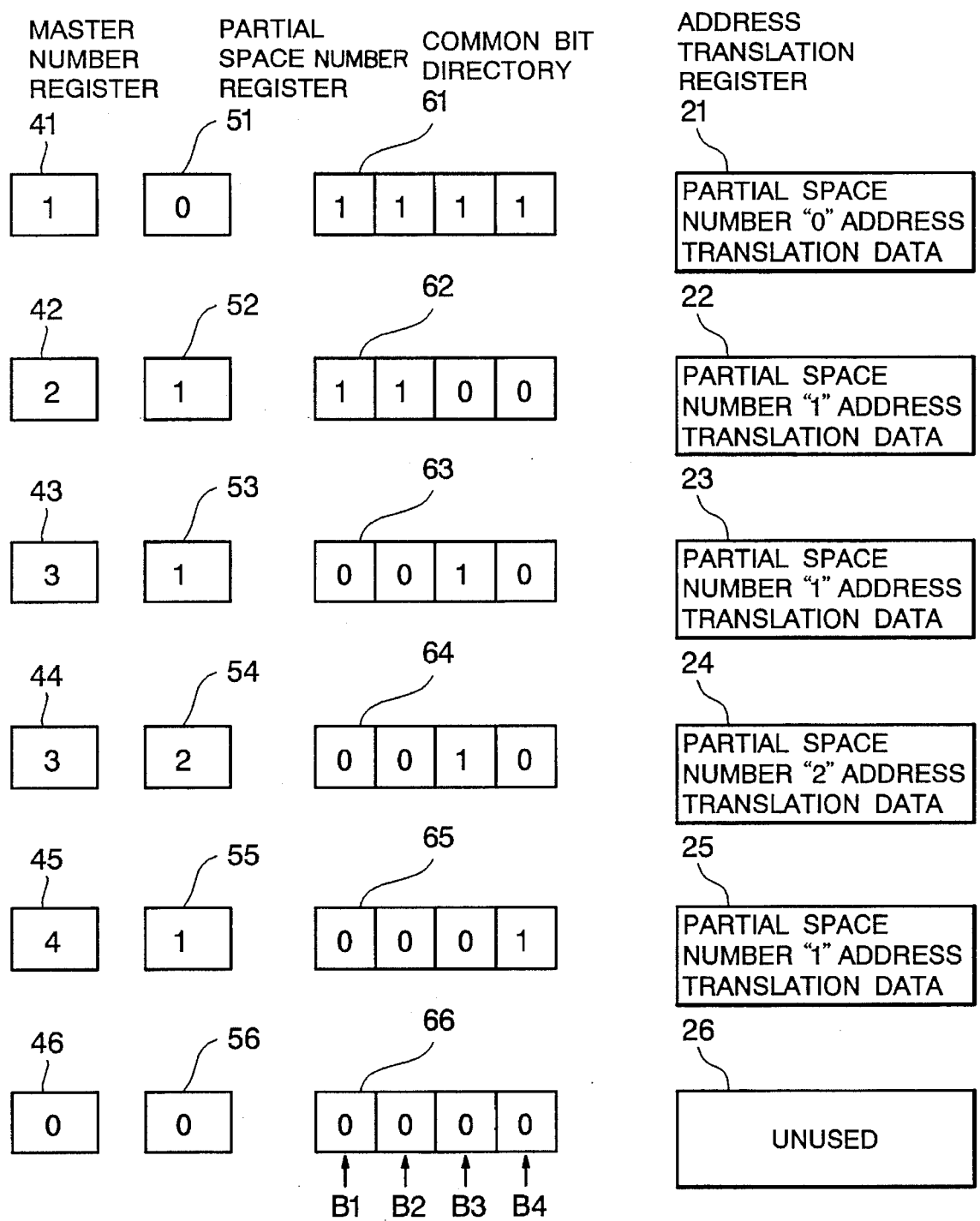
FIG. 3 is a diagram which indicates the state of the management data unit corresponding to the address translation register of the address translation register control device with a state altered from that of FIG. 2.

A preferred embodiment of the present invention is described reference to FIGS. 1 through 3. FIG. 1A indicates the construction of the multiprocessing system which employs the address translation register control device according to the embodiment of the invention. In FIG. 1A, the multiprocessing system comprises the 4 processors 11 through 14, the 6 address translation registers 21 through 26, and the management circuit 3 of the address translation registers 21 through 26.

The address translation registers 21 through 26 are registers for performing address translation of each partial space when a virtual space is divided into a number of partial spaces (pages, segments, etc.) which are spaces of equal length. That is to say, they are registers which retain data (address translation data) used in translating virtual addresses into physical addresses, and they are capable of being shared with processors 11 through 14.

The management circuit 3 is a device which manages address translation registers 21 through 26. The management circuit 3 consists of control circuit 31, management data unit 32, master number assignment circuit 33, master number retrieval circuit 34, address translation register load circuit 35, common bit set circuit 36, common bit reset circuit 37, and access control circuit 38.

Management data unit 32 retains varieties of data used during management of address translation registers 21 through 26 by address translation register management circuit 3. The management data unit 32 possesses master number registers 41 through 46, partial space number registers 51 through 56, and common bit directories 61 through 66, in order to accommodate address translation registers 21 through 26, as shown in FIG. 1B.

Common bit directory 61 through 66 is a section which manages the assignment state of address translation registers 21 through 26 in relation to processors 11 through 14, and it is constituted of, for example, registers. The common bit directory 61 through 66 contains the 4 indicating bits B1, B2, B3, and B4, which respectively correspond to processors 11 through 14. The common bit directory 61 through 66 of the preferred embodiment uses the values of the aforementioned bits B1, B2, B3, and B4 to supervise the situation concerning which of the processors 11 through 14 are using the address translation registers from among 21 through 26 corresponding to the appropriate common bit directory 61 through 66. For example, when address translation register 21 is being used by processor 12 alone, common bit directory 61 indicating bit B2 alone is set at logical value "1", and the remaining indicating bits B1, B3, and B4 are all set at logical value "0". In addition, when address translation register 21 is being shared by processors 12 and 13, common bit directory 61 indicating bits B2 and B3 are set at logical value "1" and the remaining indicating bits B1 and B4 are set at logical value "0".

Partial space number registers 51 through 56 are registers which manage the partial spaces involved during the use of address translation registers 21 through 26, and they retain the partial space numbers which are being made the object of translation of by address translation registers 21 through 26. Master number registers 41 through 46 are registers which manage the master numbers which have meaning as discriminates of tasks (processes) assigned to each of the processors 11 through 14. Assigned master numbers are retained in the master number assignment circuit 33, which will be described below. These master numbers are used at times of sharing or release of address translation registers 21 through 26.

Access control circuit 38, via processors 11 through 14 which correspond to the indicating bits from among B1 through B4 (the indicating bits in the common bit directory 61 through 66 in the management data unit 32) which are set at logical value "1", makes possible access to address translation registers 21 through 26 which correspond to the common bit directory 61 through 66. Each processor from among processors 11 through 14 gains access to the assigned address translation register from among 21 through 26, through the aforementioned access control circuit 38, and translates virtual addresses into physical addresses. That is to say, in the case of access of memory not shown in the diagram from processors 11 through 14, the virtual address composed of a partial space number and the off-set in that partial space is translated into a physical address of an actual space, and access is obtained. Also, translation from a virtual address to a physical address is performed by address translation registers from among 21 through 26 for which the partial space number in partial space number register 51 through 56 is in concordance with, and for which the logical value of the indicating bit corresponding to the common bit directory 61 through 66 processor from among 11 through 14 is "1".

Master number assignment circuit 33 assigns a new master number which is not presently used from among the master number register 41 through 46, whenever an unused address translation register from among 21 through 26 is used in a processor 11 through 14. Master number retrieval circuit 34, whenever it is used to cause a certain processor to share an address translation register from among 21 through 26 which is the same as that in another processor, carries out a search for the address translation register from among 21 through 26 for which a common bit directory 61 through 66 in which the indicating bit corresponding to the "other" processor listed above has a logical value of "1" exists and simultaneously for which a partial space number register 51 through 56 for which the designated partial space number is set, and when found, the corresponding master number contained in the master number register 41 through 46 is returned.

Address translation register load circuit 35, whenever an unused address translation register 21 through 26 is used in processor 11 through 14, in addition to carrying out a search for an unused address translation register from among address translation register 21 through 26 for which all indicating bits in the common bit directory 61 through 66 are set at "0", address translation data is loaded from the page table etc. of an external memory of the aforementioned address translation register not included in the diagram. Subsequently, the indicator bit corresponding to the aforementioned processor of the common bit directory 61 through 66 corresponding to the aforementioned address translation register 21 through 26 is set at a Logical number of "1", after which the partial space number and master number essential to the partial space number register 51 through 56 and master number register 41 through 46 are set.

Common bit set circuit 36, whenever a different processor causes a certain processor to share the same identical address translation register from among 21 through 26 which is in use, sets the indicator bit corresponding to the processor in the common bit directory 61 through 66 corresponding to the aforementioned address translation register 21 through 26 at the Logical number "1". Common bit reset circuit 37, in the case of a certain processor no longer necessitating the use of address translation register 21 through 26, sets the indicator bit corresponding to the processor in the common bit directory 61 through 66, where the designated master number has been set in the master number register 41 through 46 and the designated Partial Space number has been set in the partial space number register 51 through 56, at the logical value "0".

Control circuit 31 receives the requests from each processor 11 through 14 which is related to address translation register 21 through 26, controls circuits 33 through 37, which are mentioned above, and control circuit performs share control of address translation register 21 through 26 of processors 11 through 14.

The following is a description of the operation of the address translation register control circuit of the invention, which is constructed in the manner described above. It is assumed that the state of address translation register 21 through 26 is as depicted in FIG. 2.

Concerning address translation register 21, it is shared in use by processors 11 through 14 for address translation of a partial space of partial space number "0". In such a case, as shown in FIG. 2, all indicator bits B1 through B4 of common bit directory 61 corresponding to address translation register 21 are set to logical numbers of "1", and the Partial Space number "0" within Partial Space number register 51 is set. However, in master number register 41 the master number "1" is set.

Concerning address translation register 22, it is shared in use by processors 11 and 12 for address translation of a partial space with a partial space number "1". In such a case, as shown in FIG. 2, only indicating bits B1 and B2 of common bit directory 62 corresponding to address translation register 22 are set at logical value "1", and partial space number "1" of partial space number register 52 is set. However, master number "2" has already been set in master number register 42.

Concerning address translation register 23, it is used by processor 13 for address translation of a partial space with a partial space number "1". In such a case, as shown in FIG. 2, only indicating bit B3 of common bit directory 63 corresponding to address translation register 23 is set at "1", and a partial space number "1" of partial space register 53 is set. However, master number "3" has already been set in master number register 43.

Concerning address register 24, it is used by processor 13 for address translation of a Partial Space with a partial space number "2". In such a case, as shown in FIG. 2, only indicating bit B3 of common bit directory 64 corresponding to address translation register 24 is set at "1", and partial space number "2" of partial space register 54 is set. However, master number 3 has already been set in master number register 44.

Concerning address registers 25 and 26, they are not used by any of the processors 11 through 14. In such a case, as shown in FIG. 2, all indicating bits of common bit directory 65 and 66 corresponding to address translation register 25 and 26 are set at "0". However, concerning partial space number register 55 and 56 and master number register 45 and 46 corresponding to the unused address translation register 25 and 26, the values last employed in the address translation register 25 and 26 remain, but these values are not referred to. In situations such as those above, the access control circuit 38, based on the content of the common bit directory 61 through 66, makes possible access from processors 11 through 14 corresponding to address translation register 21, from processors 11 and 12 corresponding to address translation register 22, and from processor 13 corresponding to address translation registers 23 and 24.

Figure 5:
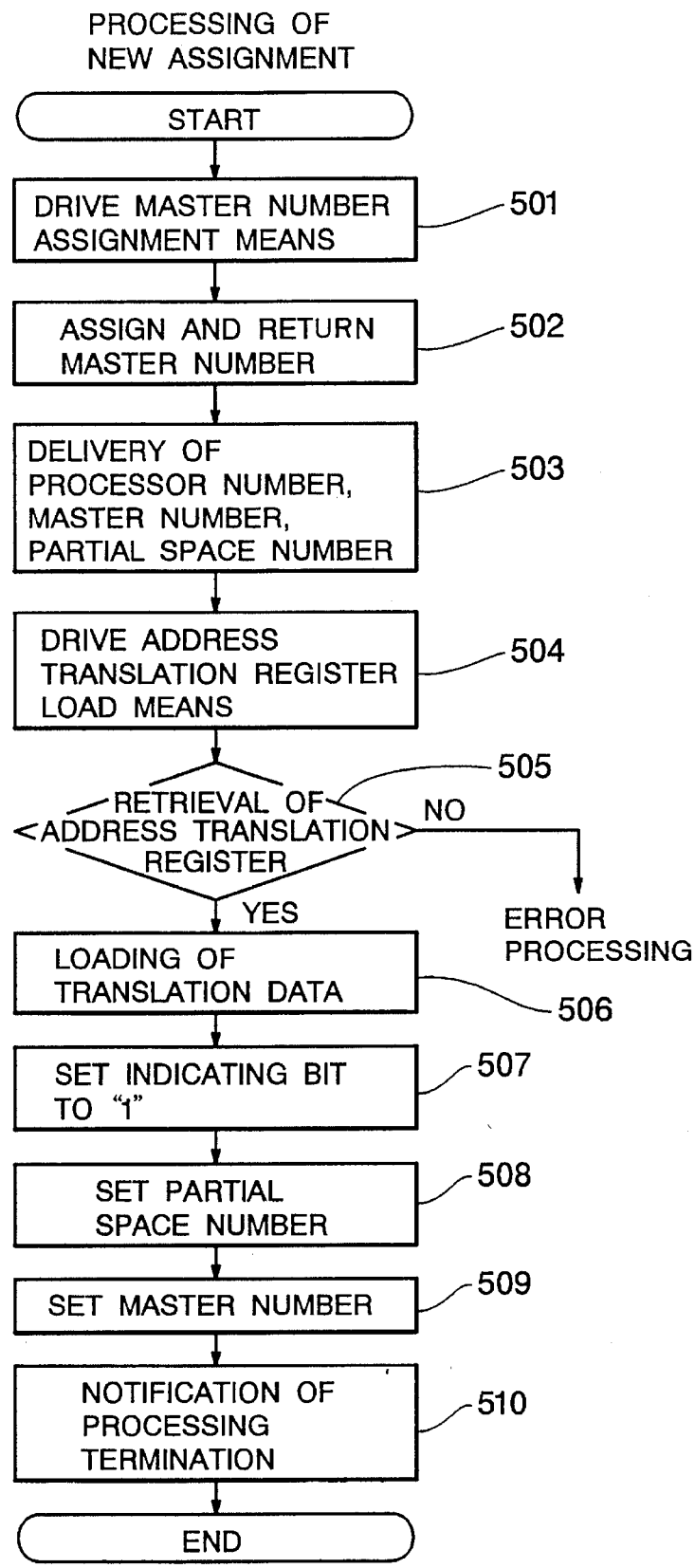
FIG. 5 is a flow chart which serves to describe processing corresponding to a new assignment request of the address translation register of the processor.

If it is imagined that in a situation similar to those mentioned above, if an address register which was not being used by any other processor became a necessity for partial space number 1 address translation, the newly assigned processing would be as explained in the flow chart in FIG. 5.

In this case, processor 14 delivers new assignment requests which include partial space number 1 and address translation data location data, etc., to address translation register management circuit 3. Address translation register management circuit 3 receives the new assignment request from the aforementioned processor 14 and begins by starting the drive of master number assignment circuit 33 (Step 501). Master number assignment circuit 33 assigns a new master number (for example 4), and the number is returned to control circuit 31 (Step 502).

Next in the sequence, control circuit 31 passes on the number of processor 14, master number 4, the translation subject's partial space number 1 and address translation data location data, etc., and the drive of address translation register load circuit 35 is started (Steps 503, 504). Address translation register load circuit 35 first of all searches for an address translation register which corresponds to the common bit directory in a situation of all indicating bit logical value being set at "0" (Step 505). In such a case, it can be imagined that, for example, as an unused address translation register, address translation register 25 was found. However, in the case of the absence of an address translation register, it would result in error processing.

The address translation data from the external memory is loaded into this address translation register 25 according to the aforementioned position data (Step 506). Then, the bit B4 in the common bit directory 65, which corresponds to the address translation register 25, is set at a logical value of "1" (Step 507), the partial space number "1" is set at the partial space number register 55 (Step 508), and the master number "4" is set at the master number register 45 (Step 509).

On completion of the above-mentioned processing by the address translation register load circuit 35, the control circuit 31 issues a processing completion notification which accompanies the master number "4" to the processor 14, where the request for the processing originates (Step 510). FIG. 3 shows the status when the processing of a new assignment request from processor 14 has been completed. In this status, the processor 14 is able to access an address translation register 25 through the access control circuit 38, which enables it to translate the address of the partial space having the partial space number "1."

Another assumption in the FIG. 3 status is when the processor 12 does not need to use an address translation register 22 anymore because the task has been switched, and instead needs the address translation register 25 having the partial space number "1" as is the case with the processor 14. In this case, the processor 12 sends a release request, which contains the master number "2" and the partial space number "1" and other data, and a share request, which contains the number of the processor 14 and the partial space number "1" and other data, to the address translation register control circuit 31.

Figure 6:
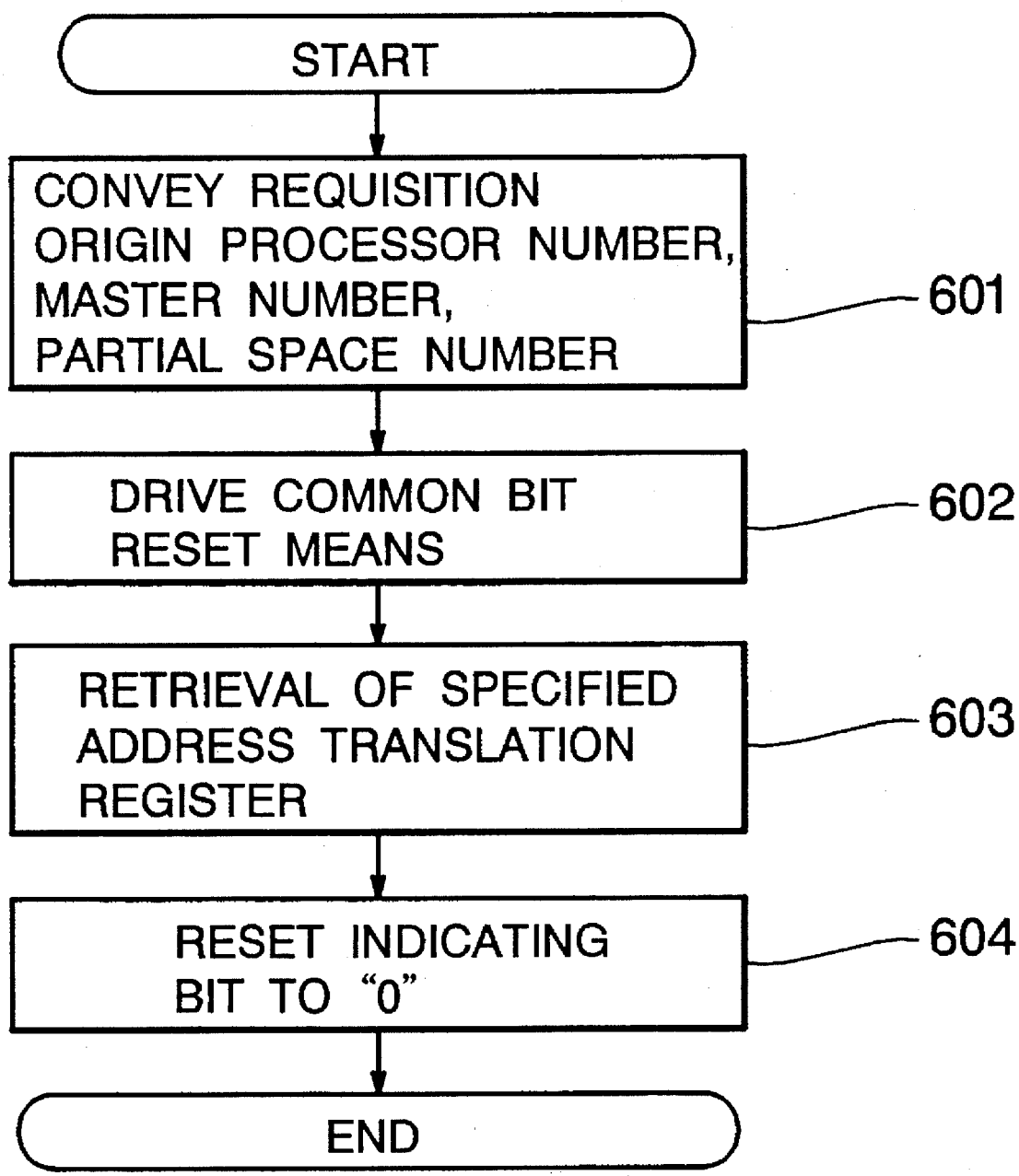
FIG. 6 is a flow chart which serves to describe processing corresponding to an address translation register cancellation request from the processor.

The control circuit 31 of the address translation register control circuit first performs processing with regard to the release request as shown in the flow chart of FIG. 6. That is, it passes the number of the processor 12, where the request originates, the master number "2" and the partial space number "1" on to the common bit reset circuit 37 (Step 601), and activates the common bit reset circuit 37 (Step 602). The common bit reset circuit 37 then finds the address translation register 22 which contains the master number "2" in the master number register 42 as well as the partial space number "1" in the partial space number register 52 (Step 603), and resets the bit B2, which corresponds to the processor 12, within the common bit directory 62, which corresponds to the address translation register 22, at a logical value of "0" (Step 604).

Next, the control circuit 31 moves on to processing with regard to the share request as shown in the flow chart of FIG. 7. It first passes the partial space number "1," which has been specified in the share request, and the number of the processor 14 on to the master number retrieval circuit 34 (Step 701), and activates the master number retrieval circuit 34 (Step 702). Master number retrieval circuit 34 finds the appropriate address translation register according to the share request (Step 703). In this case, the appropriate address translation register is address translation register 25, which holds the partial space number "1" in the partial space number register 55 and where the indicating bit B4 in correspondence to the processor 14 within the common bit directory 65 has a logical value of "1." The master number "4," which has been set at the master number register 45 in correspondence to the address translation register 25, is returned to the control circuit 31 (Step 704).

The control circuit 31 then passes the number of the processor 12, where the request originates, the master number "4" and the partial space number "1" on to the common bit set circuit 36 (Step 705), and activates the common bit set circuit 36 (Step 706). According to the data that it has received, the common bit set circuit 36 finds the address translation register 25, which holds the master number "4" in a master number register 41 through 46 as well as the partial space number "1" in a partial space number register 51 through 56 (Step 707), and sets the indicator bit B2, which corresponds to the processor 12, within the common bit directory 65, which corresponds to the address translation register 25, at a logical value of "1" (Step 708). On completion of the foregoing, the control circuit 31 issues a processing completion notification which accompanies the master number "4" to the processor 12, where the request for the processing originates (Step 709).

Figure 4:
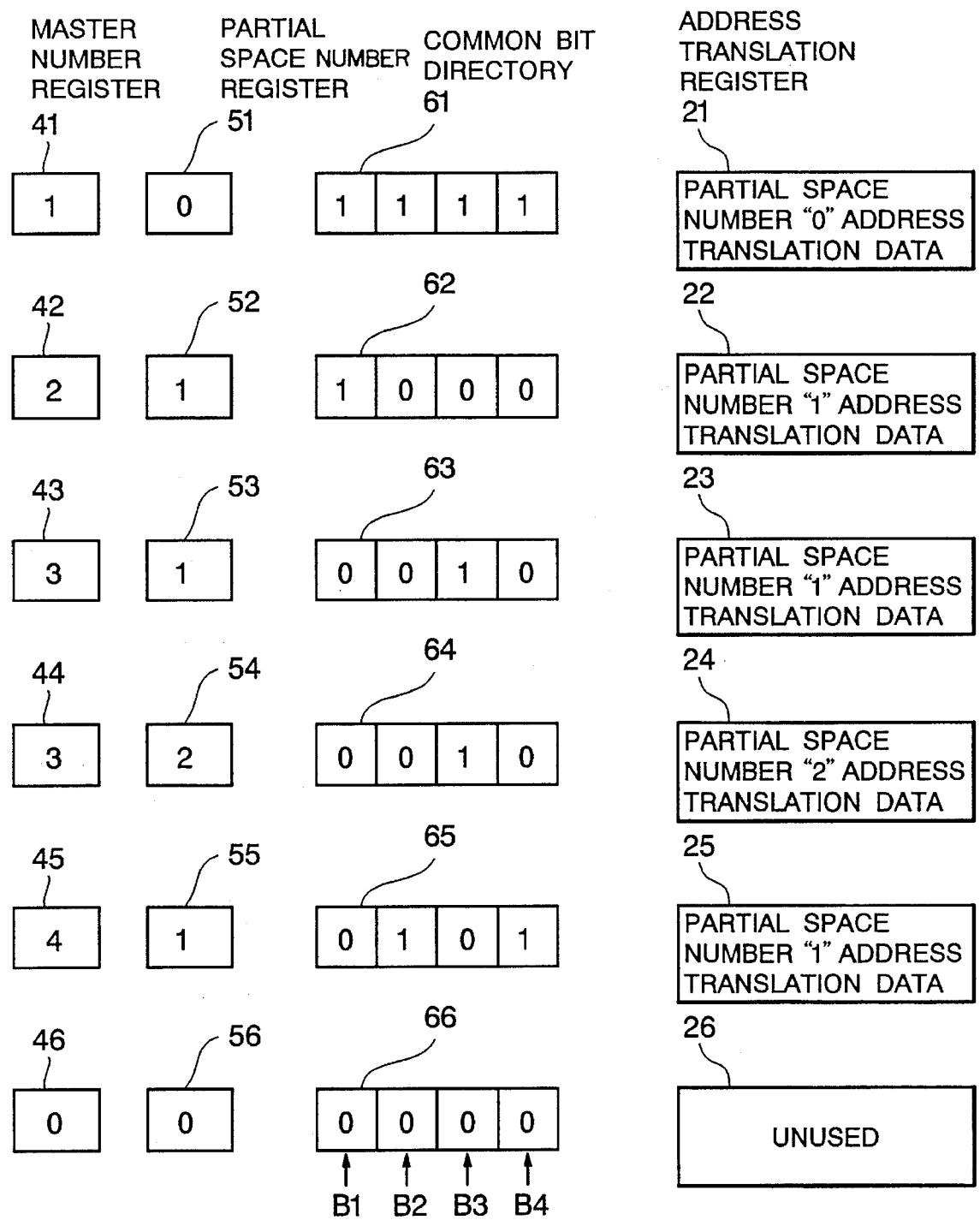
FIG. 4 is a diagram which indicates the state of the management data unit corresponding to the address translation register of the address translation register control device with a state altered from that of FIG. 3.

After a release request and a share request originating from processor 12 have been processed as described above, the state of control data unit 32 as shown in FIG. 3 changes to one as shown in FIG. 4. By this method, it becomes possible for processor 12 to share the address translation register 25 having the partial space number "1" with processor 14, instead of the address translation register 22, through access control circuit 38, and to use the address translation register 25 to perform the address translation of the partial space having the partial space number "1."

Thus, this invention implements a more efficient switching (assignment) of multiple address translation registers 21 through 26 incorporated in a multiprocessor system.

As explained in the foregoing, this invention supports not only the conventional assignment methods of address translation registers, like the master/slave method, but also other types of assignment, by controlling more than one address translation register separately from the processors and thereby enabling the assignment of an arbitrary address translation register according to a request from each processor. Hence, the task on a processor, which has initially been using an address translation register, can be switched even when another task which uses the same address translation register is being executed on another processor. This advantage increases the processing efficiency of multiprocessor computer systems which use multiple address translation registers.

Needless to mention, this invention has various application variations in addition to the above-mentioned invention. For instance, while the aforementioned invention describes a multiprocessor system comprising 4 processors and provided with 6 address translation registers, the numbers of processors and address translation registers are arbitrary. Also, the numbers of the master number registers, the partial space registers, and the common bit directories of the management data unit 32 vary according to the number of address translation registers to be used. All these variations, as far as they are within the true intention and scope of this invention, are included in the claims.

What is claimed is:

1. An address translation register control device in a multiprocessor system including a plurality of processors, said address translation register control device comprising:

a plurality of address translation registers commonly used by said plurality of processors for address translation of a virtual address within a virtual address space into a physical address within a physical address space, said virtual address space being partitioned into a plurality of groups of virtual addresses, each one of said groups of virtual addresses including a plurality of partial spaces of equal size; and management circuit, responsive to a request from one of said plurality of processors, for assigning said one processor to one of said address translation registers, said management circuit including a processor data storage means for storing processor information indicative of which of said processors are currently assigned to use each of said address translation registers, and a partial space data storage means for storing partial space information indicative of said partial spaces corresponding to said address translation registers, said management means assigning one of said address translation registers to said one processor by storing said processor information in said processor data storage means and by storing said partial space information in said partial space data storage means.

2. An address translation register control device as recited in claim 1, wherein said processor data storage means of said management means has a bit string, wherein a subset of said bit string serves as said processor information.

3. An address translation register control device as recited in claim 1, wherein said management means is operative for assigning an additional one of said processors to said one of said address translation registers, and for deassigning said additional one of said processors to said one of said address translation registers.

4. An address translation register control device as recited in claim 1, wherein said management means further comprises:

loading means for loading address translation information of said partial spaces corresponding to a request by a requesting one of said plurality of processors to one of said address translation registers currently not assigned to any one of said plurality of processors, storing said processor information corresponding to said requesting one of said plurality of processors in said processor data storage means corresponding to said unassigned address translation register, and storing said partial space information in said partial space data storage means of said unassigned address translation register.

5. An address translation register control device as recited in claim 1, wherein said management means further comprises access control means for controlling access from said one processor corresponding to said processor information stored in said processor data storage means.

6. An address translation register control device as recited in claim 3, wherein said management means further comprises:

loading means for loading address translation information of said partial spaces corresponding to a request by a requesting one of said plurality of processors to one of said address translation registers currently not assigned to any of said processors, storing said processor information corresponding to said requesting one of said plurality of processors in said processor data storage means corresponding to said unassigned address translation register, and storing said partial space information in said partial space data storage circuit corresponding to said unassigned address translation register; and access control means for controlling access from said requesting one of said plurality of processors corresponding to said processor information stored in said processor data storage means corresponding to said unassigned address translation register.

7. An address translation register control device as recited in claim 1, wherein said management means further comprises:

for each address translation register, master number storage means for processing a master number serving as an identifier of a task assigned to said one of said plurality of processors using said address translation register;

means for setting said master number corresponding to a new assignment request for said address translation register not in use, wherein said master number is set in said master number storage means at an occurrence of said new assignment request for said address translation register from a requesting one of said plurality of processors making said new assignment request; and means for returning said master number of said master number storage means corresponding to said address translation register in use, when said requesting one of said plurality of processors uses said address translation register in common with another one of said plurality of processors which is currently using said address translation register.

8. An address translation register control device as recited in claim 1, wherein said management means further comprises:

resetting means for releasing said processor information corresponding to said one of said plurality of processors in said processor data storage means corresponding to one of said address translation registers for which said one of said plurality of processors has completed use thereof; and setting means for setting said processor information indicative of one of said plurality of processors in said processor information storage means corresponding to said address translation register in use when said one of said plurality of processors uses said address translation register which is currently used by another one of said plurality of processors;

loading means for loading address translation information of said partial space corresponding to a request to one of said address translation registers not in use, setting said processor information corresponding to said one processor making said request in said processor data storage means corresponding to said one of said address translation registers, and setting said partial space information in said partial space storage means;

access control means for controlling access from said processor corresponding to said processor information stored in said processor data storage means;

for each of said address translation registers, master number storage means for processing a master number serving as an identifier of a task assigned to said processor;

means for setting said master number corresponding to a new assignment request for said address translation register not in use, in said master number storage means at the occurrence of said new assignment request for said address translation register from said processor; and means for returning said master number of said master number storage means corresponding to said address translation register in use, when said one of said plurality of processors uses said address translation register in common with another one of said plurality of processors which is currently using said address translation register.

\* \* \* \* \*